Dec. 6, 1927.

R. D. EVANS 1,651,449

SYSTEM OF DISTRIBUTION

Filed April 1, 1922

WITNESSES:
R. J. Butler.
W. R. Coley

INVENTOR
Robert D. Evans.
BY
Wesley G. Carr
ATTORNEY

Patented Dec. 6, 1927.

1,651,449

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION.

Application filed April 1, 1922. Serial No. 548,832.

My invention relates to systems of distribution for electric railways and the like and it has special relation to the prevention or neutralization of inductive interference in telephone lines or other intelligence-communication circuits that run parallel to the railway system.

One object of my invention is to provide a relatively simple and inexpensive distribution system, which may be adapted to inherently reduce inductive interference voltages in a neighboring telephone conductor, or the like, to a negligible value.

More specifically stated, it is an object of my invention to provide, in conjunction with the usual supply circuit and a distribution circuit including a trolley conductor, a track conductor and a feeder conductor, a three-winding transformer having a single primary winding connected across the supply circuit, the junction-point of the secondary windings being connected to the track conductor, and certain outer terminals of the secondary windings being respectively connected to the feeder conductor and the trolley conductor, the impedances of the windings of said transformer being so proportioned relative to each other that, under operating conditions, the effective impedance of the transformer winding that is directly connected to the trolley conductor—that is, the impedance of the corresponding branch of an equivalent star-connected network representing the transformer—is substantially zero.

The equivalent net-work, as here considered, involves three impedance devices connected in star relation, but not inductively coupled, which will act in the same manner as the actual three windings that are inductively coupled. In this equivalent network, all values of impedance are evaluated with respect to the same voltage.

Viewed from another angle, it is an object of my invention to provide a three-winding transformer of the above character, in conjunction with auto-transformers or other three-winding transformers located along the distribution circuit, the relative impedances of the parts being such that the inductive interference effect upon a parallel telephone conductor or the like is substantially negligible under all operating conditions of the system.

My invention may best be understood by reference to the accompanying drawings,

Fig. 1 of which is a diagrammatic view of an electrical system organized in accordance with my present invention;

Figure 1:
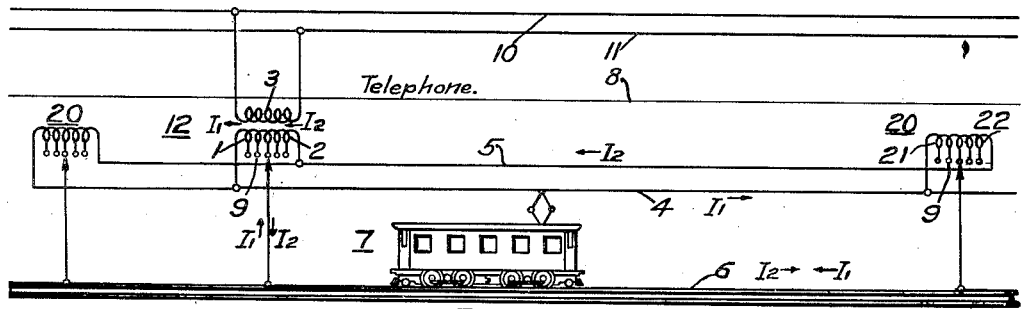

Referring to Fig. 1 of the drawing, the system here illustrated comprises a suitable single-phase supply circuit or transmission line comprising conductors 10 and 11, a three-winding transformer 12, the primary winding 3 of which is connected across the supply-circuit conductors 10 and 11, and which is provided with two secondary windings 1 and 2. The railway distribution system comprises the usual trolley conductor 4, which may be of either the overhead or the third-rail type, a feeder conductor 5 that parallels the trolley conductor 4 along the right-of-way, and the customary track or rails 6 upon which locomotives or other rolling stock 7 may travel, receiving energy from the trolley conductor 4, in accordance with a familiar practice.

A telephone or other intelligence-communication conductor 8 is disposed along the right-of-way of the railway system in the usual manner and would be located within the zone of magnetic influence of the trolley conductor 4, thereby causing inductive interference with the transmission of messages, were it not for the provision of my present invention.

The junction-point of the secondary windings 1 and 2 of the three-winding transformer 12 is connected to the rails or track conductors 6, while the outer terminals of the secondary windings 1 and 2 are respectively connected to the trolley conductor 4 and the feeder conductor 5.

At suitable points along the line, autotransformers 20 are provided, each autotransformer comprising two windings 21 and 22 which correspond to the above-described windings 1 and 2 and are connected to the conductors 4, 5 and 6 in a similar manner.

In order to permit balancing of the circuits under different conditions of distribution, such as a feeder conductor being out of service, a plurality of taps 9 are provided upon the secondary windings of the several transformers as will be more clearly explained hereinafter.

Figure 2:
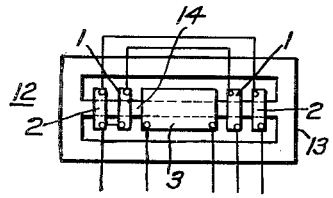
Fig. 2 is a diagrammatic view of the preferred arrangement of coils in my three-winding transformer.

Fig. 2 illustrates the preferred arrangement of coils or windings in the three-winding transformer 12, whereby the desired proportion of impedances of the windings under operating conditions may be obtained. The transformer 12 is shown as comprising a shell-type core 13 upon the middle leg 14 of which the coils 1, 2 and 3 are wound. The primary winding 3 is located at the central part of the core leg 14 and constitutes a continuous coil. On the other hand, the secondary windings 1 and 2 are divided into two coils each, the two coils constituting the winding 1 being located near the ends of the primary winding 3, while the two coils comprising the winding 2 are located outside of the other coils. The desired series connection of the windings 1 and 2 may be made in any suitable manner, as illustrated in Fig. 2. The reason for the special transformer construction just described will be apparent from the explanations given hereinafter.

Figure 3:
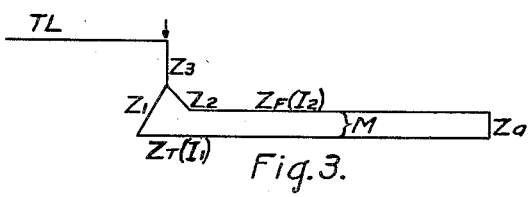
Fig. 3 is a simplified impedance chart indicating the impedances of various portions of a one-line diagram equivalent to a portion of the system that is shown in Fig. 1.

The important features of the present invention will be readily comprehended from Fig. 3, which indicates in a simplified manner the effective or equivalent impedance values of the various elements that are illustrated in Fig. 1, assuming, as we may, that the locomotive load, which is usually located at an intermediate point between the two transformers, is replaced by two equivalent loads at the two ends of the trolley section 4, or at the junction points of the trolley and the transformer windings 1 and 21, respectively, in accordance with a well-known method of analysis as set forth in an article by Copley in the Electric Journal, August, 1920, page 326.

In the equivalent circuit shown in Fig. 3, the impedance of the transmission line or supply circuit may be represented by the line TL, while the impedances of the three windings 1, 2 and 3 of the three-winding transformer 12 are represented by the three lines or vectors $Z_1$, $Z_2$ and $Z_3$, respectively. The impedance of the feeder-rail circuit (5—6) extending between the two transformers is represented by the upper horizontal line $Z_F$, while the impedance of the coextensive trolley-rail circuit (4—6) is indicated by the lower horizontal line $Z_T$. The impedance of the auto-transformer 20 may be indicated by the vertical line $Z_a$ connecting the ends of the lines $Z_F$ and $Z_T$. The mutual impedance between the trolley-rail circuit and the feeder-rail circuit may be represented in a conventional manner by the character M and will correspond to the distance between the three-winding transformer 12 and the auto-transformer station.

In order to prevent or neutralize inductive interference in the telephone conductor 8, the ideal condition (considering the equivalent net-work, as previously described) is, first, to make the equivalent $Z_1$ of the transformer winding 1 that is connected to the trolley conductor 4 equal to zero. By making the equivalent impedance $Z_1$ of the transformer winding 1 equal to zero, by suitable design methods which will subsequently be described, it follows that the equivalent locomotive load-component at the left-hand end of the trolley section 4 or $Z_T$, where it joins the transformer winding 1 or $Z_1$, will be drawn from the supply transformer winding 3 or $Z_3$, without causing any currents to flow in the trolley-rail-feeder circuit $Z_T$, $Z_a$, $Z_F$, $Z_2$. Consequently, there will be no inductive interference effect in the telephone line 8.

In general, when a line $Z_T$ is connected to a line $Z_F$ by means of a two-winding transformer $Z_a$ and a parallel-connected three-winding transformer $Z_1$, $Z_2$, $Z_3$, the last mentioned transformer being utilized to couple an independent circuit TL to the line $Z_T$, if the equivalent impedance $Z_1$ of the coupling between the three-winding transformer and the line $Z_T$ is made zero, the currents supplied by the transformer couplings $Z_2$ and $Z_a$ will be independent of the load transferred between the third circuit TL and the transformer coupling $Z_1$. This is an important feature in transformer designs and connections, and it will be described more in detail hereinafter.

A second condition which should be observed, in order to prevent or neutralize inductive interference in the telephone conductor 8, is that the effective or equivalent impedance of the trolley-rail circuit $Z_T$ should equal the combined effective impedances of the feeder-rail circuit $Z_F$, the effective impedance $Z_2$ of the transformer secondary winding 2 and the effective impedance $Z_a$ of the auto-transformer 20, as will be demonstrated hereafter. Equating the above-mentioned values, we have (1) $Z_1 = \text{zero}$ (2) $Z_T = Z_F + Z_2 + Z_a.$ In the general case, when the locomotive 7 is at an intermediate point between the ends of the trolley section represented by $Z_T$, the locomotive load may be considered, as far as inductive effects are concerned, as being replaced by two loads of appropriate magnitudes, disposed at the respective ends of the trolley section, because the trolley and track currents flowing in opposite directions towards the locomotive quite effectively neutralize one another in their inductive effects. It has been shown that, if equation (1) is satisfied, the equivalent load-component at the transformer winding 1 does not produce any currents in the trolley-rail-feeder circuits, and hence does not produce inductive interference in the neighboring telephone conductor 8.

In regard to the equivalent load-component at the other end of the trolley section $Z_T$, or at the junction point of the auto-transformer coupling represented by $Z_a$, we may consider its inductive effects with reference to the equivalent one-line diagram in Fig. 3, which was drawn with this load-condition in mind. Thus, the impedance $Z_F$ of the equivalent circuit is the impedance of the whole feeder circuit between the two transformers, reduced, of course, to trolley voltage, in case of a voltage difference therebetween, and including both the ground or rail return circuit and the feeder conductor. In like manner, the impedance $Z_T$ is the impedance of the circuit including the trolley and the rail or ground return. The impedance $Z_a$ is the equivalent impedance of the auto-transformer coupling, and the impedance M is the very considerable distributed mutual impedance representing the effect of one circuit on the other.

The voltage drops around the mesh in Fig. 3 must total zero. Thus, $$I_1(Z_1 + Z_T) - MI_2 = I_2(Z_2 + Z_F + Z_a) - MI_1. \quad (2')$$

For no induction, the rail current must be zero; hence $I_2 = I_1$. Thus, $$Z_T + Z_1 = Z_F + Z_2 + Z_a. \quad (2'')$$

If $Z_T = 0$, equation (2'') reduces to equation (2), which is the condition to be proved.

The coupling impedances $Z_2$ and $Z_a$ are naturally small compared to $Z_F$. Since these impedances are positive in value, the effective feeder-circuit impedance $Z_F$ can be made smaller than the effective trolley-circuit impedance $Z_T$, and equation (2) may be satisfied. It is noted, however, that if the feeder voltage is the same as the trolley voltage, as has been suggested in the past, it would be economically impractical to make the feeder impedance less than the trolley impedance, because the trolley conductor, for mechanical reasons, must be a very large wire. In order to satisfy equation (2) in a practical manner, therefore, it is obvious that the feeder voltage should be somewhat higher than the trolley voltage, so that its equivalent impedance, when expressed in terms of the trolley voltage, can conveniently be made less than the trolley impedance. In other words, the transformer windings 2 and 22 should have more turns than the windings 1 and 21, respectively.

The taps 9 on the transformer windings are for the purpose of varying the voltage ratio, and hence the relative values of the effective equivalent impedances $Z_F$ and $Z_T$, either for the purpose of making an initial adjustment to satisfy the conditions for no induction, or for the purpose of adapting the railroad system to changed conditions after the initial installation has been made, as when a feeder is temporarily out of service, or when a single-track installation is changed to a double-track installation.

The effective transformer coupling $Z_1$ between the three-winding transformer 12 and the trolley 4 may be made substantially zero or of negligible value, as required by equation (1), by properly proportioning the parts of the transformer in accordance with the following computations.

Let $X_{3,2}$ = the impedance between the primary coil 3 and the secondary coil 2 of the three-winding transformer 12, with winding 1 open-circuited.

$X_{3,1}$ = the impedance of the transformer between the primary winding 3 and the secondary winding 1, with winding 2 open-circuited.

$X_{1,2}$ = the impedance of the transformer between the secondary windings 1 and 2, with winding 3 open-circuited.

These reactance values may be measured or calculated as in a two-coil transformer in the usual way: one winding being open-circuited, a second short-circuited and voltage being applied to the remaining winding. The impedance in question is then the ratio of this applied voltage to the current flowing.

If we assume that $$X_{3,2} = 6.5\% x$$
$$X_{3,1} = 6.0\% x, \text{ and}$$
$$X_{1,2} = 0.5\% x,$$

then the effective impedance of the primary winding 3 may be calculated as follows:

$$(3) \quad Z_3 = \frac{X_{3,1} + X_{3,2} - X_{1,2}}{2} = 6.0\% x$$

$$(4) \quad Z_2 = \frac{X_{3,2} + X_{1,2} - X_{3,1}}{2} = 0.5\% x$$

$$(5) \quad Z_1 = \frac{X_{3,1} + X_{1,2} - X_{3,2}}{2} = 0\% x$$

The significance of the special transformer design shown in Fig. 2 will now be apparent. The winding 2, being farthest removed from the winding 3, will have a high impedance for power exchanged between the same. The winding 1, being closer to the winding 3, will have a somewhat lower impedance for power exchanged between the same. The high-voltage winding 3, however, consisting of many turns bunched together, will have a far greater leakage reactance with either of the windings 2 or 3 than the leakage between the two closely related secondary windings 2 and 3. By this means, the impedance values $X_{3,2}$, $X_{3,1}$, and $X_{1,2}$ may be properly chosen, as indicated above.

It will be appreciated that the ohmic resistance of the transformer winding 1 cannot be made zero but, in any event, this resistance value is relatively small and, compared to the resistance value of the trolley conductor 4 plus the feeder conductor 5, the resistance of the transformer winding 1, as well as the reactance of the corresponding circuit, may be neglected or considered as substantially zero.

Figure 4:
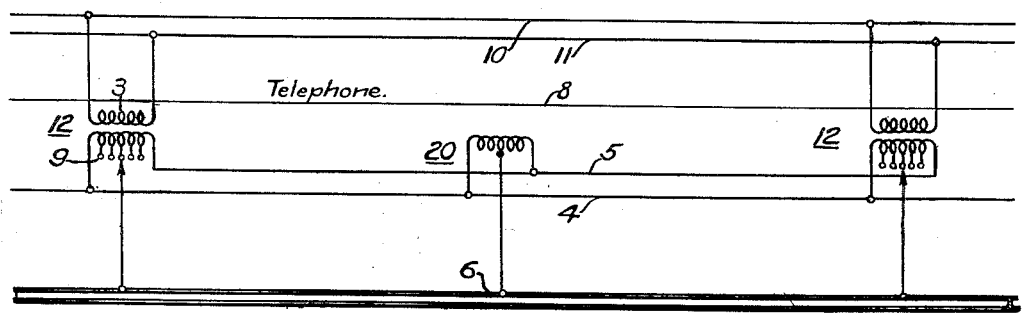
Fig. 4 is a diagrammatic view of a modified system organized in accordance with my invention.

The same general relation of parts may be employed in the modified system shown in Fig. 4, wherein the three-winding transformer 12 may be duplicated at suitable points along the system. Furthermore, the auto-transformer 20 may be employed at intermediate points between the three-winding transformers 12, if desired, although the use of such auto-transformers is not necessary to the operation of the system shown in Fig. 4.

Figure 5:
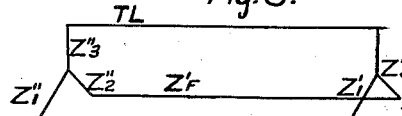
Fig. 5 is a simplified impedance chart corresponding to the system that is shown in Fig. 4.

A simplified diagram in Fig. 5 illustrates the relative effective impedances of the two three-winding transformers 12, together with the effective impedances of the interconnecting circuits. From the similarity of this diagram to the diagram shown in Fig. 3 and previously explained, it is believed that no detailed description is necessary. It will be readily appreciated that the same mathematical treatment may be applied to the circuits shown in Fig. 4 and the same general result be obtained for the desired purpose of preventing inductive interference in the telephone conductor 8. In brief, the following equations should obtain:

$$(1^a) \quad Z'_1 = Z''_1 = 0$$
$$(2^a) \quad Z'_T = Z'_F + Z'_2 + Z''_2$$

Thus, by the arrangements described above, the current in the track rails is reduced to zero and the inductive interference effect upon the telephone conductor 8 is negligible. This reduction of current in the track rails is indicated by the opposing arrows. It should further be noted that the currents in the feeder and trolley conductors also flow in opposite directions, thus assisting in minimizing the inductive interference effect.

Figure 6:
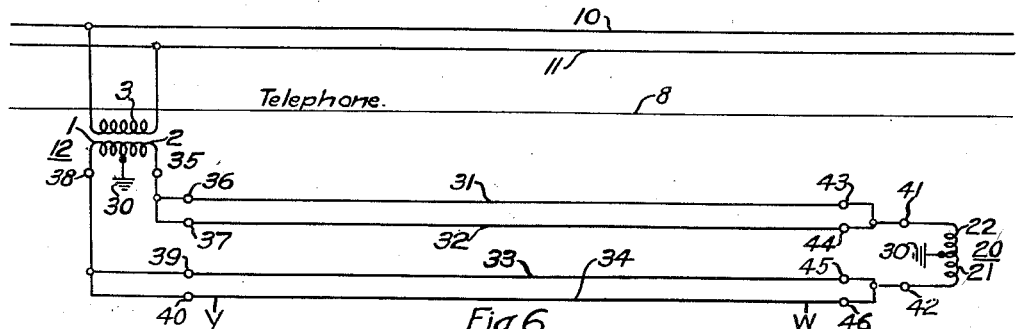
Fig. 6 is a diagrammatic view of a further modification of my invention.

Referring to Fig. 6, the system illustrated includes the three-winding transformer 12 and one or more auto-transformers 20 together with the supply-circuit conductors 10 and 11 and the parallel telephone conductor 8.

In addition, the outer terminal of the secondary transformer winding 2 is connected through a pair of parallel feeder conductors 31 and 32 corresponding to a double track railway system. In a similar manner, the outer terminal of the secondary transformer winding 1 is connected to the system through two parallel trolley conductors 33 and 34, which are located above the respective tracks. For the sake of simplicity, the track circuits are represented in a simple manner by the grounds 30.

For adequate protection to the system, a plurality of circuit-breakers 35 to 46, inclusive, are introduced into the circuits of the secondary transformer windings. A single high-capacity circuit-breaker 35 is connected near the outer terminal of the transformer winding 2, while circuit-breakers 36 and 37 are connected in the respective feeder conductors 31 and 32 near the three-winding transformer 12. At the other end of the feeder conductors, near the auto-transformer 20, another pair of circuit-breakers 33 and 34 are connected in the feeder conductor circuits, while a single high-capacity circuit-breaker 41 serves to connect the joined ends of the feeder conductors 31 and 32 to the corresponding outer terminal of the auto-transformer winding 22.

A circuit-breaker 38 is connected to the outer terminal of the transformer winding 1 while a plurality of circuit-breakers 39 and 40 are connected in the respective trolley conductors 33 and 34 near the three-winding transformer 12. A single circuit-breaker 42 is connected between one outer terminal of the auto-transformer winding 21 and a plurality of circuit-breakers 45 and 46, which are connected in the respective trolley conductors 33 and 34.

In the event of a ground or short-circuit at either the point W or the point Y, the inductive interference effect with respect to the telephone conductor 8 that occurs before the circuit-breakers 40 and 46 open is of a relatively small value, especially when compared to the inductive effect that would take place in former systems employing the ordinary two-coil shunt transformer, the secondary terminals of which were directly connected to the trolley conductor and the rails. In one specific instance, calculations have shown that, whereas in the older type of system just outlined, the inductive rise before the opening of the circuit-breakers 40 and 46 might be as high as 2000 volts in the case of a short-circuit or ground at the point W or the point Y, if a three-winding transformer system as illustrated in Fig. 6 were employed, the corresponding rise of voltage would not exceed 300 volts.

In other words, in the event of a short-circuit at the point Y, the relations of impedances of the three-winding transformer 12 are such as to produce a negligible interference effect in the neighboring telephone conductor 8; that is, a short-circuit on winding 1 produces substantially no voltage in the other secondary winding 2, or reduces such voltage to substantially zero.

I do not wish to be restricted to the specific circuit connections or arrangements of parts herein set forth, as various modifications thereof may be effected without departing from the spirit and scope of my invention. I desire, therefore, that only such limitations shall be imposed as are indicated in the appended claims.

I claim as my invention:

1. An electrical system comprising a supply circuit, a distribution circuit including a plurality of working conductors and a feeder conductor, and a plural-winding transformer having one winding connected to said supply circuit and points in other windings connected to said feeder and said working conductors, the windings of said transformer being so related to each other as to reduce the effective impedance value of one of said windings to a negligible figure.

2. An electrical railway system comprising a supply circuit, a distribution circuit including a trolley conductor, a track conductor and a feeder conductor, and a three-winding transformer having a single primary winding connected across said supply circuit, the junction-point of the secondary windings being connected to said track conductor and an outer terminal of said secondary windings being respectively connected to said feeder conductor and said trolley conductor, the impedances of the windings of said transformer being so proportioned relative to each other that under operating conditions the effective impedance of one of said windings is substantially zero.

3. An electrical railway system comprising a supply circuit, a distribution circuit including a trolley conductor, a track conductor and a feeder conductor, and a three-winding transformer having a single primary winding connected across said supply circuit, the junction-point of the secondary windings being connected to said track conductor and an outer terminal of said secondary windings being respectively connected to said feeder conductor and said trolley conductor, the impedances of the windings of said transformer being so related to each other that the effective impedance of the transformer winding directly connected to the trolley conductor is substantially zero.

4. An electrical system comprising a supply circuit, a distribution circuit including a plurality of working conductors and a feeder conductor, a plural-winding transformer having one winding connected to said supply circuit and points in other windings connected to said feeder and said working conductors, and a plurality of transformer windings remotely located from said other windings and connected in a similar manner, the windings of said plural-winding transformer being so related to each other as to reduce the effective impedance value of one of said windings to a negligible figure.

5. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a two-winding transformer remotely located from said three-winding transformer and connected in the same manner as the secondary windings thereof, the impedances of the windings of said three-winding transformer being so proportioned relative to each other that under operating conditions the effective impedance of one of said windings is substantially zero.

6. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a two-winding transformer remotely located from said three-winding transformer and connected in the same manner as the secondary windings thereof, the impedances of the windings of said three-winding transformer being so related to each other that the effective impedance of the transformer winding directly connected to the trolley conductor is substantially zero.

7. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a two-winding transformer remotely located from said three-winding transformer and connected in the same manner as the secondary windings thereof, the impedances of the windings of said transformer being so proportioned relative to the impedances of said conductors and said two-winding transformer and to each other that under operating conditions the external inductive interference effect of said distribution circuit is substantially zero.

8. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a two-winding transformer remotely located from said three-winding transformer and connected in the same manner as the secondary windings thereof, the impedances of the windings of said transformer being so related to the impedances of said conductors and said two-winding transformer and to each other and the flow of currents being such that the inductive interference effect of said distribution circuit upon a parallel intelligence-communication conductor is substantially zero.

9. An electrical system comprising a supply circuit, a distribution circuit including a plurality of working conductors and a feeder conductor, a plural-winding transformer having one winding connected to said supply circuit and points in other windings connected to said feeder and said working conductors, and a plurality of transformer windings remotely located from said other windings and connected in a similar manner, the effective equivalent-circuit impedance of one of the windings of said plural-winding transformer being of negligible value and the effective impedance of the circuit including said working conductors being substantially equal to the combined effective equivalent-circuit impedances of one of the windings of said plural-winding transformer, the last-named transformer windings, and the circuit including said feeder conductor.

10. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a two-winding transformer remotely located from said three-winding transformer and connected in the same manner as the secondary windings thereof, the effective equivalent-circuit impedance of one of the secondary windings of said three-winding transformer being substantially zero and the effective impedance of the circuit including said trolley conductor being substantially equal to the combined effective equivalent-circuit impedances of the other secondary winding of said three-winding transformer, said two-winding transformer, and the circuit including said feeder conductor.

11. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a two-winding transformer remotely located from said three-winding transformer and connected in the same manner as the secondary windings thereof, the effective equivalent-circuit impedance of the secondary winding of said three-winding transformer that is directly connected to said trolley conductor being substantially zero and the effective impedance of the circuit including said trolley conductor being substantially equal to the combined effective equivalent-circuit impedances of said two-winding transformer, the remaining secondary winding of said three-winding transformer, and the circuit including said feeder conductor.

12. An electrical system comprising a supply circuit, a distribution circuit including a plurality of working conductors and a feeder conductor, and a plurality of spaced-apart plural-winding transformers each having one winding connected to said supply circuit and points in other windings connected to said feeder and said working conductors, the effective equivalent-circuit impedances of certain windings of said transformers being of negligible value and the effective impedance of the circuit including said working conductors being substantially equal to the combined effective equivalent-circuit impedances of other windings of said transformers and the circuit including said feeder conductor.

13. An electrical railway system comprising a supply circuit, a distribution circuit including a trolley conductor, a track conductor and a feeder conductor, and a plurality of spaced-apart three-winding transformers each having a single primary winding connected across said supply circuit, the junction point of the secondary windings of each transformer being connected to said track conductor and outer terminals of said secondary windings being respectively connected to said feeder conductor and said trolley conductor, the effective equivalent-circuit impedances of certain corresponding secondary windings of said transformers being of negligible value and the effective impedance of the circuit including said trolley conductor being substantially equal to the combined effective equivalent-circuit impedances of the remaining secondary windings of said transformers and the circuit including said feeder conductor.

14. An electrical railway system comprising a supply circuit, a distribution circuit including a trolley conductor, a track conductor and a feeder conductor, and a plurality of spaced-apart three-winding transformers each having a single primary winding connected across said supply circuit, the junction point of the secondary windings of each transformer being connected to said track conductor and the outer terminals of said secondary windings being respectively connected to said feeder conductor and said trolley conductor, the effective equivalent-circuit impedances of the secondary windings directly connected to said trolley conductor being substantially zero and the effective equivalent-circuit impedance of said trolley-track circuit being substantially equal to the combined effective equivalent-circuit impedances of said feeder-track circuit and the remaining secondary windings of said transformers.

15. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a plurality of transformer windings remotely located from said three-winding transformer and connected in the same manner as the secondary windings thereof, the impedances of the several parts of the system being such that, in an equivalent circuit reduced to a common voltage and representing the several transformer couplings as non-inductively related series impedances, the impedance of the portions of the equivalent circuit representing the trolley-rail circuit extending between the two transformers and the winding of the three-winding transformer coupled thereto is substantially equal to the impedance of the portions of the equivalent circuit representing the co-extensive feeder-rail circuit and the two transformer couplings at the two ends thereof.

16. An electrical railway system comprising a supply circuit, a distribution circuit including a trolley conductor, a track conductor and a feeder conductor, a three-winding transformer having a single primary winding connected across said supply circuit, the junction-point of the secondary windings being connected to said track conductor and outer terminals of said secondary windings being respectively connected to said feeder conductor and said trolley conductor, and a plurality of transformer windings remotely located from said three-winding transformer and connected in the same manner as the secondary windings thereof, the two transformers having means for varying the voltage ratio between the feeder conductor and the trolley conductor.

17. A three-winding transformer having such impedances between the several pairs of windings thereof that the impedance between the windings of one pair is substantially equal to the sum of the impedances between the windings of the two other pairs.

18. A distribution system comprising a three-winding transformer, a two-winding transformer operating in parallel with two of the windings of said three-winding transformer, and load and supply devices whereby a load is transferred between the third winding of said three-winding transformer and one of the other windings thereof, the sum of the impedances between said last-mentioned winding and each of the other two windings of the three-winding transformer being substantially equal to the impedance between said other two windings, whereby the currents flowing in the parallel-connected windings of the two transformers are substantially unaffected by the said load.

In testimony whereof, I have hereunto subscribed my name this 29th day of March 1922.

ROBERT D. EVANS.